US009607656B1

(12) United States Patent
Serce

(10) Patent No.: US 9,607,656 B1
(45) Date of Patent: Mar. 28, 2017

(54) DYNAMIC MULTIPLE VIDEO RATINGS

(71) Applicant: Amazon Technologies, Inc., Seattle, WA (US)

(72) Inventor: Hakan Serce, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/809,909

(22) Filed: Jul. 27, 2015

(51) Int. Cl.
*H04N 5/93* (2006.01)
*G11B 27/11* (2006.01)
*G11B 27/00* (2006.01)
*H04N 21/454* (2011.01)

(52) U.S. Cl.
CPC ............ *G11B 27/11* (2013.01); *G11B 27/005* (2013.01); *H04N 5/93* (2013.01); *H04N 21/4542* (2013.01)

(58) Field of Classification Search
None
See application file for complete search history.

(56) References Cited

U.S. PATENT DOCUMENTS

2008/0040380 A1* 2/2008 Miyaki ................ G11B 27/036
2011/0307924 A1* 12/2011 Roberts .............. H04N 5/44543
725/44
2015/0188964 A1* 7/2015 Sharma ................... H04L 65/60
709/203

* cited by examiner

*Primary Examiner* — Eileen Adams
(74) *Attorney, Agent, or Firm* — Weaver Austin Villeneuve & Sampson LLP

(57) ABSTRACT

Techniques are described for providing playback of media content based on dynamic multiple video ratings. Scenes of media content can be associated with content indicators describing the types of activities within the scene. The content indicators can be used to generate ratings for scenes of the media content and the ratings can be used to modify playback of the media content, for example, by skipping playback of scenes.

20 Claims, 10 Drawing Sheets

505

Violence: ▽──────── Intensity

Language:
☒ Impolite   ☒ Profanity   ☐ Sexually Derived
             ▽────         ▽────
             Frequency     Frequency Substance Abuse:
☒ Candy/Sugar   ☒ Cigarettes   ☐ Drugs Nudity: ▽──────── Intensity Sexual Content:   ○ Yes   ⊙ No

An Amazon Original Series
Transparent
Season 1, Episode 1
An LA family with serious boundary issues have their past and future unravel when a dramatic admission causes everyone's secrets to spill out.

Playback Options ⤴ 610

DYNAMIC MULTIPLE VIDEO RATINGS

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Media content (e.g., movies, television shows, videos, music, and electronic books) often has an associated rating indicating the suitability of the content for particular audiences. Such a rating typically represents the corresponding media content as a whole. For example, a movie might be rated R, indicating that it contains some adult material. However, many portions of the movie may be suitable for a larger audience. Unfortunately, current rating systems force consumers to make decisions about whether to consume media content based on ratings that may only represent a tiny fraction of the rated content, thus eliminating a large amount of otherwise suitable content from consideration.

BRIEF DESCRIPTION OF THE DRAWINGS

FIG. 5 illustrates an example of selecting content indicators.

FIG. 6 illustrates an example of providing playback options of media content based on dynamic multiple video ratings.

DETAILED DESCRIPTION

This disclosure describes techniques for implementing dynamic multiple video ratings to provide viewers with more playback options of media content. For example, different scenes of media content (e.g., a movie) can be associated with content indicators that specify the types of content in the scene. Content indicators can indicate a scene includes intense violence and profanity. The content indicators can be analyzed and a rating can be generated for each scene. For example, the rating for the scene including intense violence and profanity can be given an R (restricted) rating, indicating that it includes some adult material. As a result, the playback of media content can be adjusted for viewers, for example, by skipping scenes that have ratings that the viewers don't want to be played back.

Figure 1:
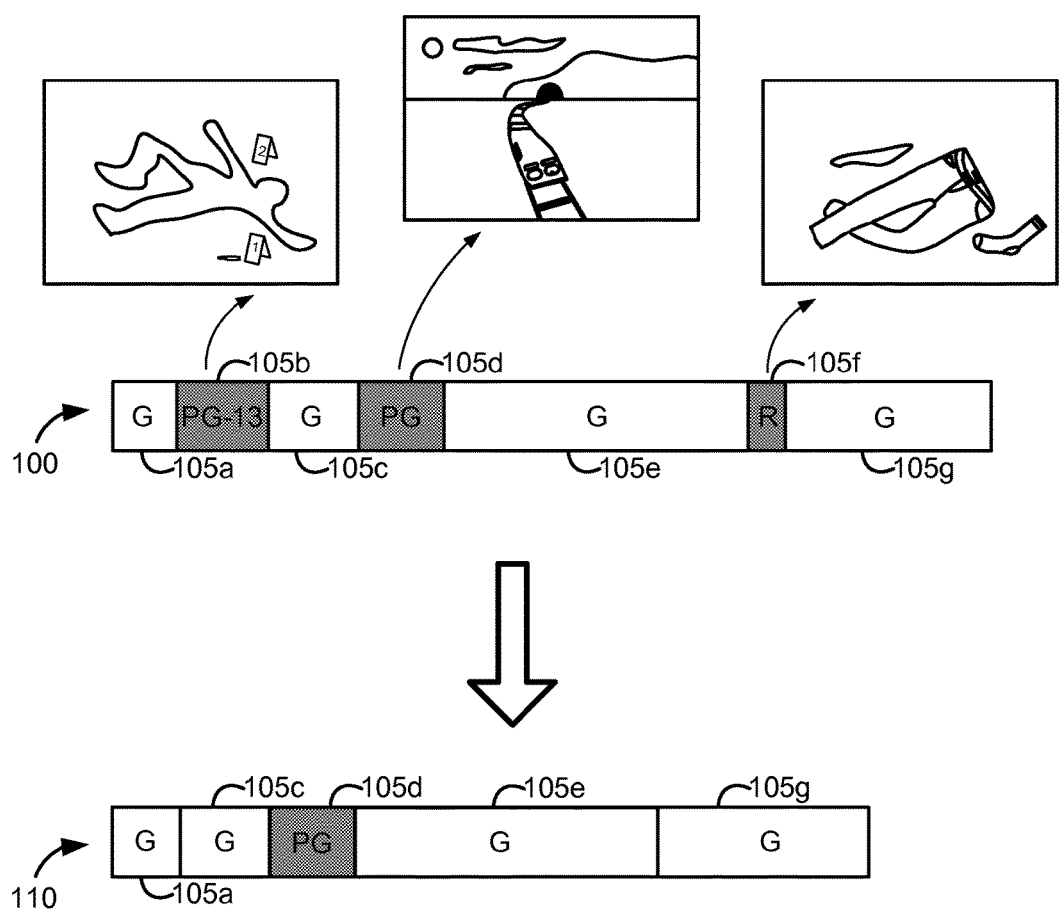
FIG. 1 illustrates an example of dynamic multiple video ratings.

FIG. 1 illustrates an example of dynamic multiple video ratings. As shown in FIG. 1, media content 100 can be an episodic show (e.g., a television show, a show on a video streaming service, etc.), movie, video (e.g., content uploaded by users of video streaming sites), or other type of media content. Media content 100 includes a sequence of scenes 105a-g that is provided during the playback of media content 100.

Generally, media content 100 can be given a rating indicating the suitability or acceptability of media content 100 for viewing audiences. For example, the Motion Picture Association of America provides a movie rating system with ratings in a hierarchy in ascending order of more mature content starting with G (General Audiences) indicating that the content of the movie is suitable for all ages, PG (Parental Guidance Suggested) indicating that some content may not be suitable for children, PG-13 (Parents Strongly Cautioned) indicating that some content may be inappropriate for children under 13, R (Restricted) indicating that a child under 17 should be accompanied by a parent or adult guardian, and NC-17 (Adults Only) indicating clearly adult content not suitable for children. Similarly, TV Parent Guidelines provide a television show rating system with a hierarchy including TV-Y indicating content that is appropriate for all children, TY-V7 indicating content that is for children age 7 and above, TV-G indicating content that is generally suitable for all ages, TV-PG indicating that content might be found inappropriate for younger children, TV-14 indicating content that might be found unsuitable for children under the age of 14, and TV-MA indicating content that is unsuitable for children under the age of 17.

Media content 100 may be rated R movie because it includes drug use, nudity, and sex. However, the rating for media content 100 as a whole can result from a single scene that has rated R content. For example, in media content 100, scene 105f includes rated R content (e.g., a scene with drug use, nudity, and sex), but the remaining scenes 105a-e and 105g include content at ratings of PG-13, PG, and G. If scene 105f was not part of media content 100, then media content 100 might have a PG-13 rating rather than an R rating.

In some implementations, each of scenes 105a-g can be given a rating based on the content of the scene and media content 100 can be provided for playback without some scenes based on their ratings. For example, in FIG. 1, media content 110 can be a version of media content 100 that can be played back for a viewer who wishes to watch media content 100 (i.e., a rated R movie), but skip scenes that are rated PG-13 or higher (i.e., PG-13, R, and NC-17). As a result, scenes 105b and 105f are not played back for the viewer because they are rated PG-13 and R, respectively, but scenes 105a, 105c-e, and 105g (i.e., G and PG scenes) are played back.

Ratings for individual scenes 105a-g can be determined by collecting content indicators used to specify the types of content in the scenes. For example, scene 105b portrays a crime scene investigation that is rated PG-13. Scene 105d portrays an action scene of a train about to derail that is rated PG. Scene 105f portrays a sex scene with clothes strewn upon the floor that is rated R. Users can watch the scenes and provide "crowd-sourced" content indicators specifying the type of content in the scenes. That is, a community of users (e.g., a community of viewers of a video streaming service, or another group of people) can collectively provide the content indicators. As one example, Mechanical Turk, a service providing a crowdsourcing Internet marketplace allowing for businesses to request and coordinate crowd-sourced data, can be used. Regarding scene 105b portraying a crime scene investigation, users may indicate that scene 105b includes intense violence and profanity. Scenes with that combination of content indicators may be rated PG-13. Likewise, regarding scene 105f, users may indicate that scene 105f includes drug use, nudity, and sex. Scenes with that combination of content indicators may be rated R. As a result, each scene can be provided a rating based on the content indicators.

Providing playback of media content 100 without scenes with certain ratings can increase the catalog of available media content to viewers. For example, parents may not want their children to watch PG-13 or higher rated movies. However, by skipping playback of PG-13 or higher scenes, parents can request playback of a PG-13 movie without the higher rated PG-13 scenes.

Figure 2:
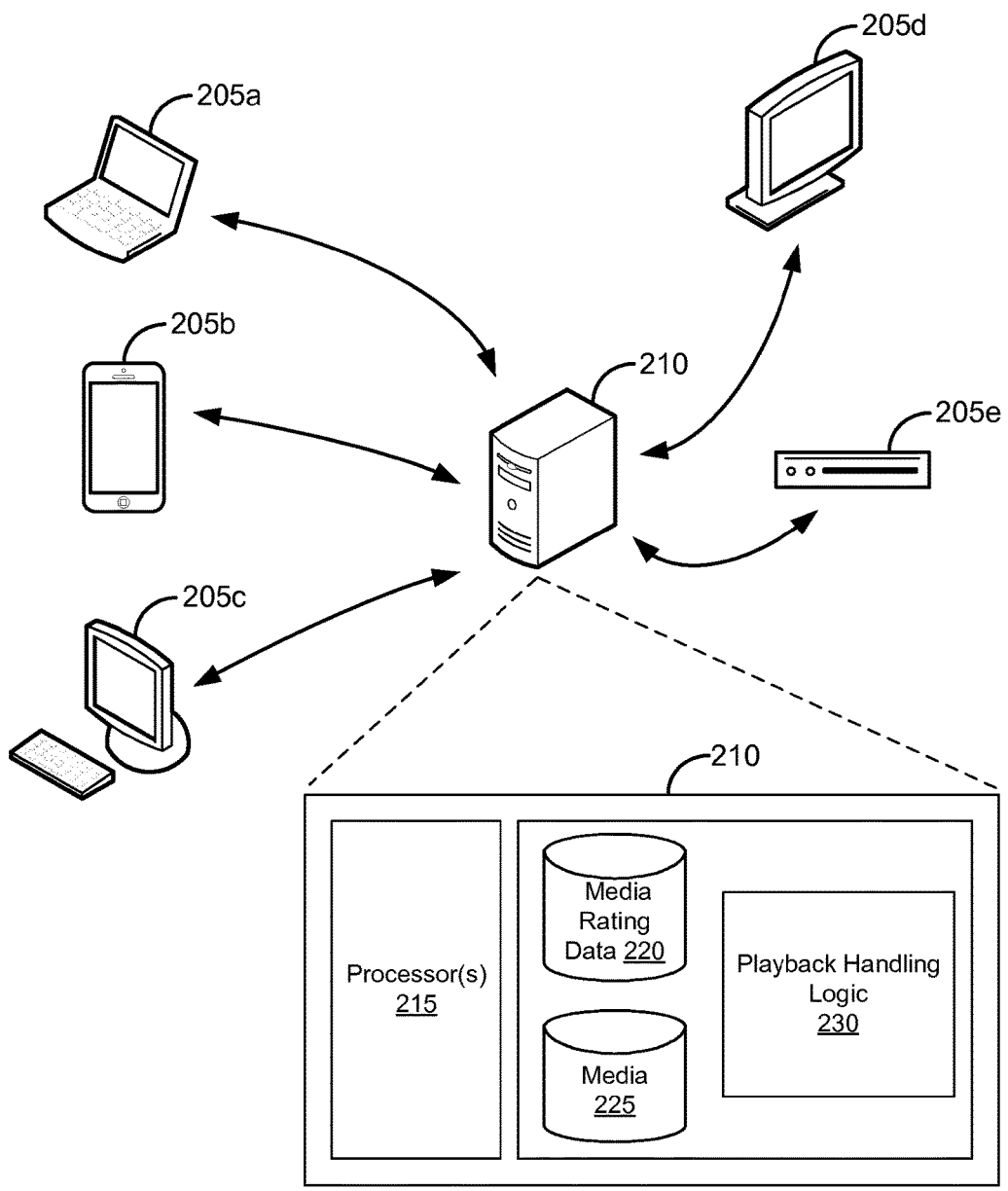
FIG. 2 illustrates an example of a computing environment for providing dynamic multiple video ratings.

FIG. 2 illustrates an example of a computing environment for providing content using dynamic multiple video ratings. The computing environment of FIG. 2 includes media server 210 which can be used to provide media content for playback on devices 205a-e. Device 205a is a laptop computer, device 205b is a smartphone, device 205c is a desktop computer, device 205d is a television, and device 205e is a set-top box. Other types of devices such as tablets, wearable devices (e.g., smart watches), etc. may also be included in the computing environment.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 210 may be part of a content delivery system that conforms to any of a wide variety of architectures. The functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on devices 205a-e), integrated into a separate app from another entity, implemented in an edge server or content server of a CDN, a server of an ISP, etc.

Media server 210 can include various types of logic used to provide media content for playback at devices 205a-e. In FIG. 2, media server 210 includes media content storage 225, media content rating data storage 220, and playback handling logic 230. Media server 210 also can include one or more processors 215, memory, and other hardware for performing the tasks disclosed herein.

Media content storage 225 stores a variety of media content for playback on devices 205a-e, such as episodes of shows, movies, music, digital books, videos (e.g., content uploaded by users of video streaming sites), etc. Additionally, media content storage 225 can store metadata associated with media content, such as the start and end times of scenes (i.e., segments of the media content) of shows and movies, manifests, etc.

Media content rating data storage 220 can be a storage mechanism, such as a database, storing content indicators and/or ratings of scenes of media content. For example, content indicators specifying the types of content in scenes can be stored in media content data storage 220. Additionally, media content rating data storage 220 can store ratings for the scenes, for example, that are generated based on the content indicators.

Playback handling logic 230 may provide media content from media content storage 225 and receive data for content indicators from devices 205a-e. For example, playback handling logic 230 may provide selected media content from media content storage 225 and receive indications of selections of content indicators for storage in media content rating data storage 220. Playback handling logic 230 can generate ratings for scenes from the content indicators stored in media content rating data storage 220. In some implementations, playback handling logic 230 can also generate content indicators for some scenes, as discussed later herein. As a result, the data in media content rating data storage 220 can be crowd-sourced from viewers of media server 210, as well as generated by playback handling logic 230 independent of or in addition to viewers. In some implementations, some functionality of playback handling logic 230 can be implemented by a video player on a client side and some functionality may be provided by media server 210. For example, a video player might receive content indicators and media content from media server 210, but the ratings may be generated by the video player.

Figure 3:
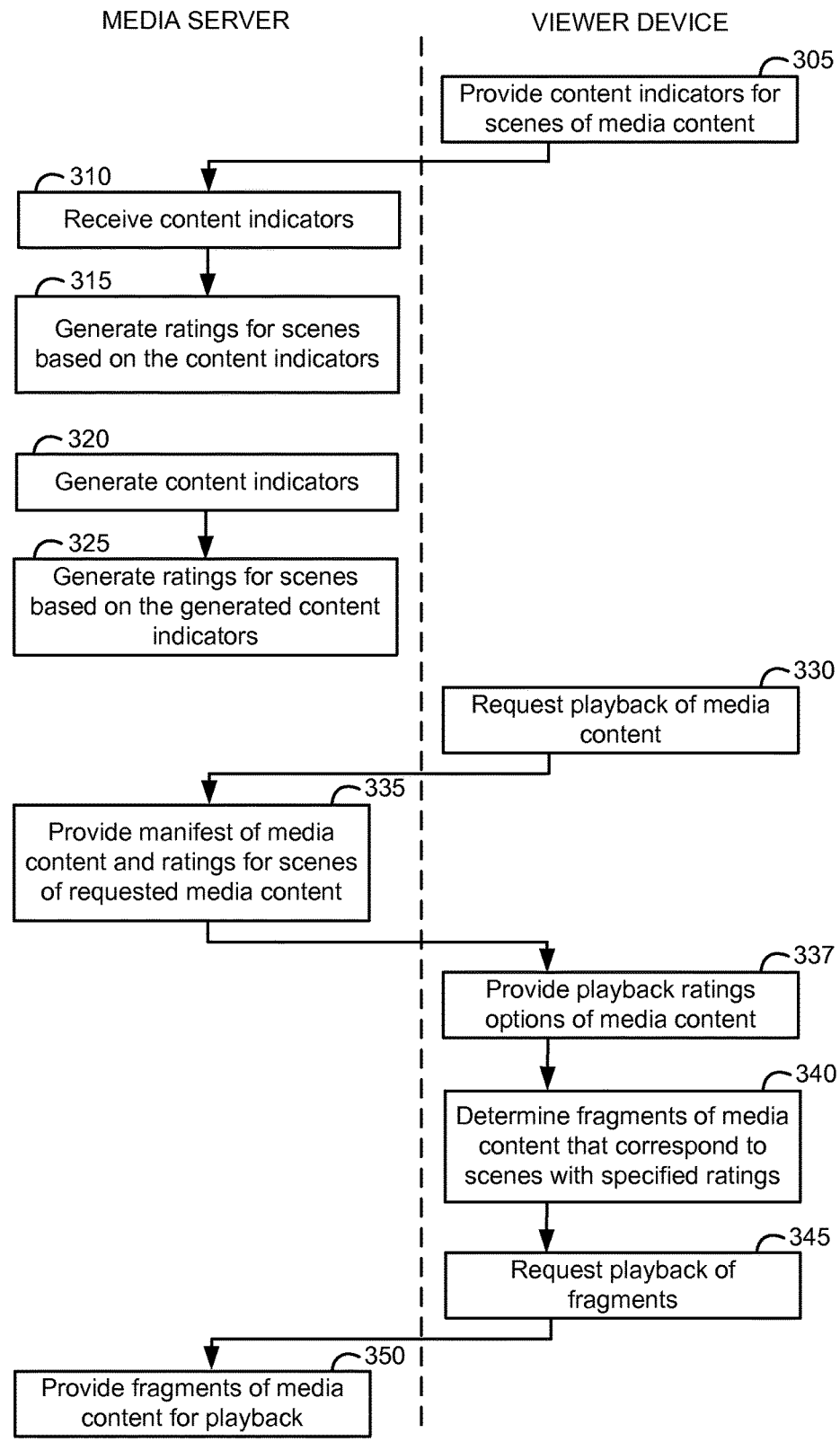
FIG. 3 is a flowchart illustrating providing dynamic multiple video ratings.

A specific implementation will now be described with reference to the computing environment of FIG. 2, the flow diagram of FIG. 3, and FIGS. 4-7. In FIG. 3, viewer devices (e.g., one of devices 205a-e) can provide content indicators for scenes of media content (305). The content indicators can be provided while the media content is being played (e.g., the viewer can select content indicators in a graphical user interface (GUI) of a video player during playback) or separately, for example, the viewer may submit data specifying content indicators for scenes at another time other than playback of the media content. As a result, content indicators can describe or detail the types of activities or content occurring within a scene of media content.

Figure 4:
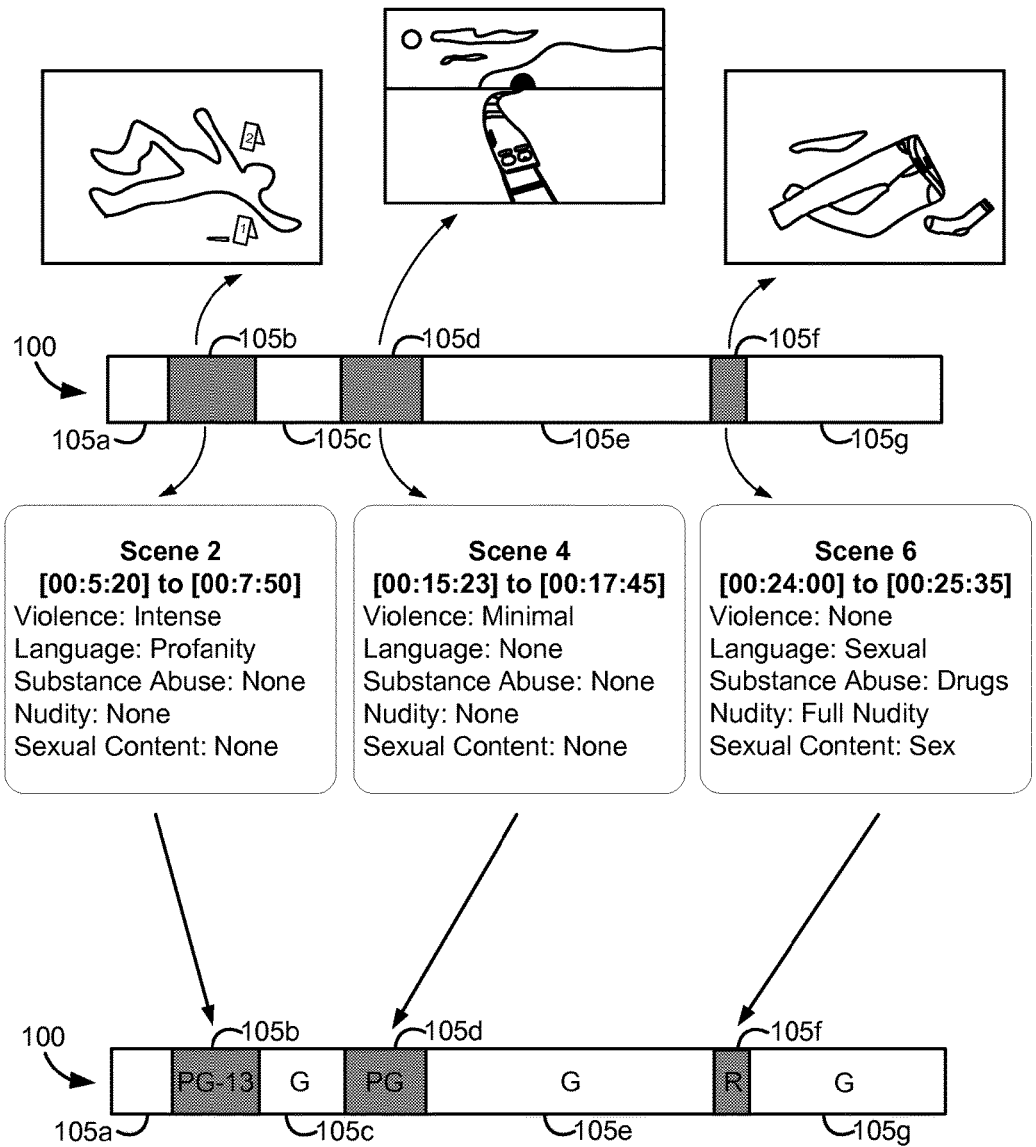
FIG. 4 illustrates an example of content indicators used for providing dynamic multiple video ratings.

Media server 210 can receive the content indicators (310) and generate ratings for the scenes based on the received content indicators (315). FIG. 4 illustrates an example of content indicators used for providing dynamic multiple video ratings. In FIG. 4, media content 100 includes a sequence of scenes 105a-g, as previously discussed. Scene 105b is the second scene of media content 100 and is for a time period of the playback of media content 100 from 5 minutes, 20 seconds to 7 minutes, 50 seconds. In FIG. 4, scene 105b (i.e., the scene with the crime scene investigation) is indicated as having violence that is intense, profanity (i.e., obscene language is spoken in the scene), but no substance abuse, no nudity, and no sexual content. Scene 105d is indicated as having a minimal level of violence, no explicit language, no substance abuse, no nudity, and no sexual content. Scene 105f is indicated as having no violence, but includes sexual language, drug use, nudity, and sex. Media server 210 can analyze the content indicators and provide a rating for each of scenes 105a-g based on the content indicators.

Different combinations of content indicators may be associated with different ratings. For example, in FIG. 4, scene 105b includes intense violence and profanity. That combination of content indicators associated with a scene may result in a PG-13 rating. By contrast, another combination of content indicators can result in another rating. For example, scene 105f includes sexual language, drug use, nudity, and sex, resulting in a combination of content indicators that provides a rated R rating. As a result, the combination of content indicators for each scene can be analyzed (e.g., with rules governing which combinations of content indicators provide certain ratings) and a rating for each scene can be generated by media server 210.

In some implementations, media server 210 can also generate content indicators (320) and use the generated content indicators to generate ratings for scenes (325). For example, media server 210 can analyze media content 100 and determine content indicators for scenes. As one example, profanity, sexual language, and other types of dialogue can be determined by media server 210 by analyzing subtitles or closed caption text of media content 100 by recognizing key words or phrases. Image recognition algorithms can also be used by media server 210 to recognize that scenes include nudity, violence (e.g., by recognizing that a scene includes a gun, knife, etc.), drug use, or other types of content indicators.

In some implementations, one or both of viewer devices and media server 210 can provide the content indicators. For example, content indicators can be provided by viewer devices and media server 210, aggregated together, and used to generate ratings for the scenes.

Eventually, a viewer device can request playback of the media content (330). If the media content is video, the viewer device can use a manifest file including metadata detailing fragments of the media content that can be requested from media server 210 to stream the video. A scene can be made of multiple fragments. As the viewer device plays back the media content, fragments may be requested from media server 210 and played on the viewer device. Fragments may be provided based on the viewer device's central processing unit (CPU) usage, bandwidth or quality of internet connection, and other factors to provide adaptive bitrate streaming.

As a result, a manifest file including metadata detailing fragments of the requested media content can be provided by media server 210 to the viewer device (335). Moreover, media server 210 can also provide ratings for scenes of the requested media content. For example, media server 210 can provide a ratings file with metadata indicating scenes and their corresponding ratings, each fragment indicated in the manifest file and the scene it is in, and/or each fragment indicated in the manifest file and the rating of the scene it is in such that the fragments can be correlated with the ratings. In some implementations, the manifest file may include the ratings. That is, the manifest file can include metadata detailing the fragments and the ratings of those fragments or scenes.

The viewer device can be presented with playback options based on the ratings (337). As one example, the viewer device can analyze the ratings file and provide playback options based on the ratings indicated in the ratings file. For example, a playback option may be provided for each rating in the ratings file. In some implementations, playback options based on ratings may only include playback options that at least ensure a threshold length of the media content can be played. For example, if an R-rated movie only has 10% of its scenes as rated G, then a rated G playback option may not be available because 10% is beneath a threshold percentage (e.g., 75%) to provide a viable playback of the movie.

In some implementations, viewer preferences can be used to determine the available playback options based on the ratings. FIG. 5 illustrates an example of selecting content indicators that can be used to determine available playback options. In FIG. 5, various content indicators can be selected by a viewer (e.g., either on the viewer device or on a website associated with media server 210) by selecting checkboxes and radio buttons for types of content and sliders indicating intensity or frequency (e.g., increasing an intensity on violence can indicate more graphic violence, increasing a frequency on profanity allows for more instances of profanity in a scene, etc.) of types of content that is appropriate for playback. The selected content indicators can be used to generate a maximum viewer rating for playback options. For example, the selected content indicators 505 in FIG. 5 may allow for playback of scenes of television shows with content indicators associated with ratings of TV-14 or below, but exclude scenes with content indicators associated with TV-MA ratings. In another example, the selection of content indicators can allow for playback of scenes designated with similar content indicators (e.g., a viewer can allow nudity, but no violence) rather than using ratings. In some implementations, viewers may select specific ratings (e.g., TV-14, but not TV-MA). FIG. 6 illustrates an example of providing playback options of media content based on dynamic multiple video ratings. In FIG. 6, playback option 610 in video player 605 indicates that a TV-MA playback option is unavailable for playback because of the selections of content indicators in FIG. 5. That is, the content indicators selected by the viewer in FIG. 5 correspond to a rating of TV-14, and therefore, only playback of TV-14 or lower scenes can be provided. In some implementations, playback option 610 may be enabled if the viewer provides an appropriate password, gesture, or other type of recognition allowing for an override of the selected content indicators 505 in FIG. 5.

Figure 7:
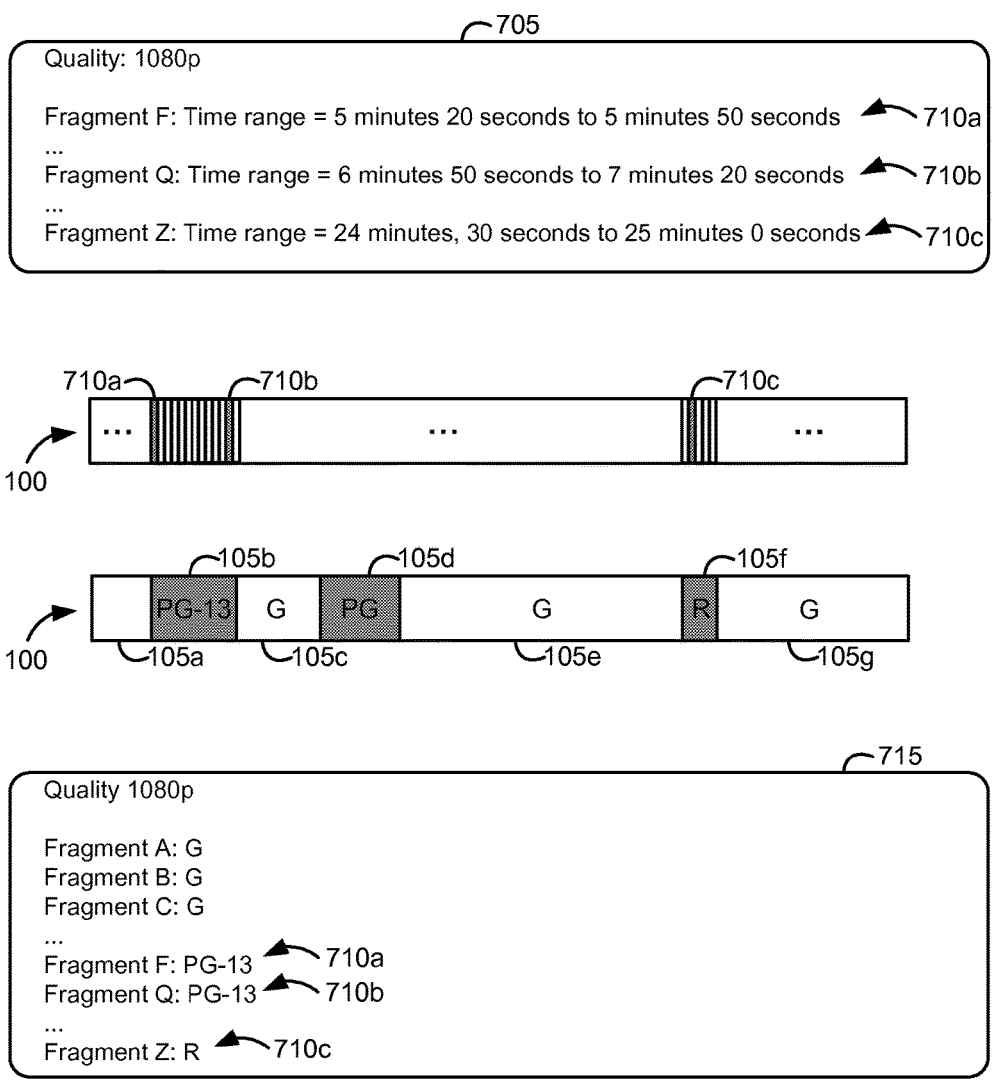
FIG. 7 illustrates an example of correlating portions of media content with dynamic multiple video ratings.

The viewer can select a playback option of a particular rating and the viewer device can determine fragments to be streamed that correspond with the rating (340). For example, if the playback option indicates that the media content should be played to provide scenes of PG-13 or lower, then the manifest file can be parsed and the fragments that are to be requested from media server 210 would be within a ratings range that corresponds to the playback option (e.g., G to PG-13 if the playback is of a PG-13 playback) (345). FIG. 7 illustrates an example of correlating portions of media content with dynamic multiple video ratings. In FIG. 7, manifest 705 is a simplified example of a portion of a manifest file that can be provided by media server 210 and used by the viewer device to determine the fragments of media content 100 to stream for playback.

In FIG. 7, fragments 710a and 710b are fragments that compose parts of scene 105b. As indicated in manifest 705, fragment 710a is video data for playback of media content 100 from 5 minutes, 20 seconds to 5 minutes, 50 seconds. Fragment 710b is video data for playback of media content from 6 minutes, 50 seconds to 7 minutes, 20 seconds. Fragment 710c is a part of scene 105f and is video data for playback of media content 100 from 24 minutes, 30 seconds to 25 minutes, 0 seconds. Additional data, such as audio data, may also be provided in fragments based on manifest 705 or another manifest file.

The ratings of fragments 710a-c can be provided by ratings file 715. In FIG. 7, ratings file 715 indicates the ratings for each fragment. For example, fragments 710a and 710b are rated PG-13 and fragment 710c is rated R. Using manifest 705 and ratings file 715, the viewer device can determine which fragments should be requested from media server 210 for playback (345) and media server 210 can provide the requested fragments to the viewer device (350). For example, the ratings for the fragments in ratings file 715 can be analyzed, and if a fragment is within the appropriate ratings range, then the same fragment can be found in manifest 705 and the viewer device can request the fragment from media server 210 using the metadata regarding the fragment in manifest 705. As a result, fragments that are indicated as being outside of the ratings range (e.g., fragment 710c) can be ignored. That is, the viewer device may not request fragment 710c from media server 210. In other implementations, ratings file 715 can include ratings for scenes and the fragments can be correlated with the scenes, for example, using scene lists including start and end times of scenes or other types of data.

In some implementations, the viewer device might request fragments indicated in 705 even for ratings outside of the ratings range (i.e., each fragment) and then decide whether to provide the fragment as part of the playback based on its corresponding rating being within the ratings range. In some implementations, media server 210 might receive an indication of a playback rating (or range) and then use manifest 705 to provide the appropriate fragments to the viewer device. That is, media server 210 can correlate the fragments to ratings in a similar matter as described above.

Additionally, a GUI similar to that of FIG. 5 can be provided to viewers to provide content indicators. For example, as the viewer watches media content, the GUI can be provided upon the completion of a scene so that the viewer can select the corresponding content indicators of the scene, for example, by selecting the checkboxes, radio buttons, and adjusting the sliders in FIG. 5. In some implementations, the playback may be paused after scenes are completed and the GUI can be provided so that the viewer can provide the content indicators for the scene that just finished. After providing the content indicators, the next scene can be played. As another example, the viewer may select a content indicator selector (e.g., a button, text, etc.) on a video player and bring up the GUI so that the viewer can provide the content indicators for the scene currently being played back. In some implementations, the settings in the GUI (e.g., the sliders, checkboxes, radio buttons, etc. that are selected) can be reset at the start of new scenes. Accordingly, when a scene ends, the current selections of the GUI can provide content indicators for the scene, and then the settings may reset so that new content indicators can be selected for the subsequent scene.

Figure 8:
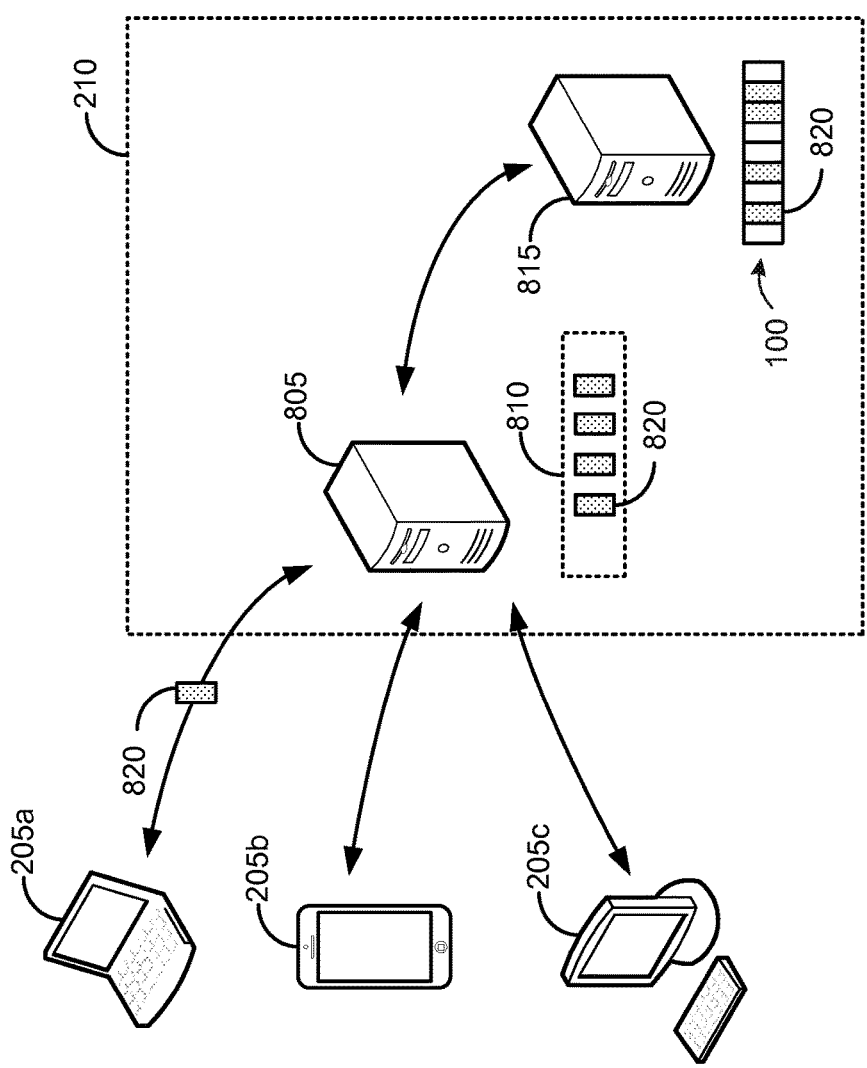
FIG. 8 illustrates an example of caching portions of media content based on dynamic multiple video ratings.

Dynamic multiple video ratings can also be used by media server 210 to cache fragments of media content 100. FIG. 8 illustrates an example of caching portions of media content based on dynamic multiple video ratings. In FIG. 8, media server 210 can be part of a content delivery network (CDN) including an edge server 805 and origin server 815. Generally, when devices 205a-c in FIG. 8 request fragments of media content 100, a request for the fragment can be provided to edge server 805. Edge server can maintain cache 810 including recently-requested fragments of media content 100. If cache 810 does not include the requested fragment, origin server 815 can be contacted by edge server 805. Origin server 815 can then provide the fragment to edge server 805, which can store the fragment in cache 810 and provide the fragment to the device which made the request. A subsequent request for the same fragment from another device can then be provided by edge server 805 by accessing cache 810 rather than receiving the fragment from origin server 815, resulting in faster delivery of fragments of media content 100, and therefore, better video streaming performance.

Edge server 805 can anticipate fragments that may be requested by devices 205a-c and cache fragments beforehand, for example, by using the ratings of the fragments or scenes. For example, device 205a can request a playback of rated R media content 100 with only scenes rated PG-13, PG, and G. Fragments of media content 100 can be stored by origin server 815. In FIG. 8, each of the shaded fragments of media content 100 are rated PG-13 or lower and the non-shaded fragments are rated R. As a result, fragment 820 of media content 100 can be requested by device 205a, which is cached by edge server 805 in cache 810 and provided to device 205a. In some implementations, device 205 can provide an indication to edge server 805 that it is performing a playback of media content 100 at PG-13 or lower and skipping rated R scenes, and therefore, edge server 805 can cache some of the remaining fragments of media content 100 that are rated PG-13 or lower in cache 810, as in FIG. 8. In another implementation, edge server 805 may determine that device 205a is not requesting the fragments that are parts of rated R scenes, for example, by comparing the requests of fragments from device 205a with the ratings file 715. If a threshold number of fragments associated with a rating are skipped, then edge server 805 can determine that fragments corresponding to that rating will not be requested by device 205a, and therefore, other fragments (e.g., fragments of ratings that are being requested) that would be most likely requested by device 205a can then be cached in cache 810 instead. As a result, the storage of fragments in cache 810 can be optimized by storing fragments of media content 100 that would be most likely to be requested next.

Figure 9:
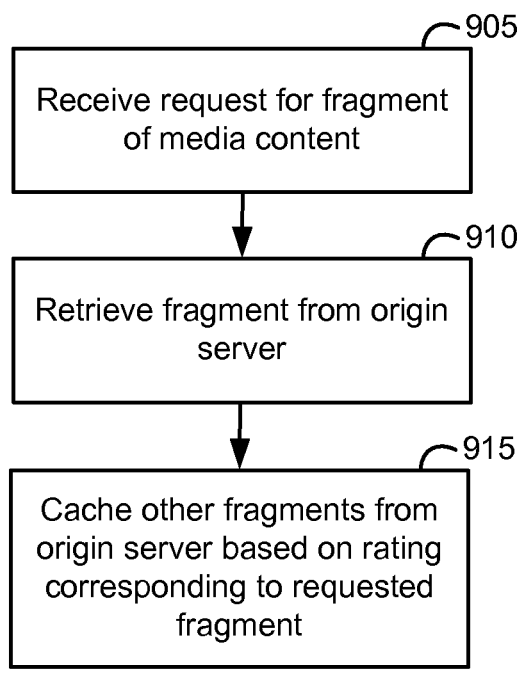
FIG. 9 illustrates a flowchart of caching portions of media content based on dynamic multiple video ratings.

FIG. 9 illustrates a flowchart of caching portions of media content based on dynamic multiple video ratings. In FIG. 9, an edge server can receive a request from a device for a fragment of media content for playback (905). The edge server can retrieve a copy of the fragment from an origin server, store the copy of the fragment in a cache at the edge server, and provide a copy of the fragment to the device (910). The edge server can also anticipate the next fragments to be requested by the device by determining the rating of the requested fragment and retrieving fragments with a similar rating to be stored in the cache at the edge server (915).

Figure 10A:
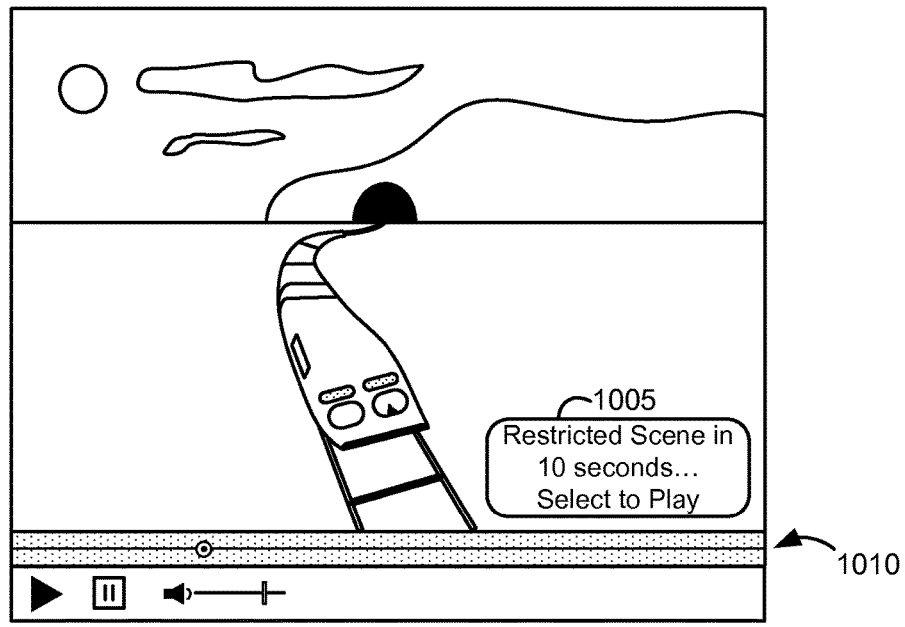
FIGS. 10A and 10B illustrate examples of indicating restricted scenes based on dynamic multiple video ratings.
Figure 10B:
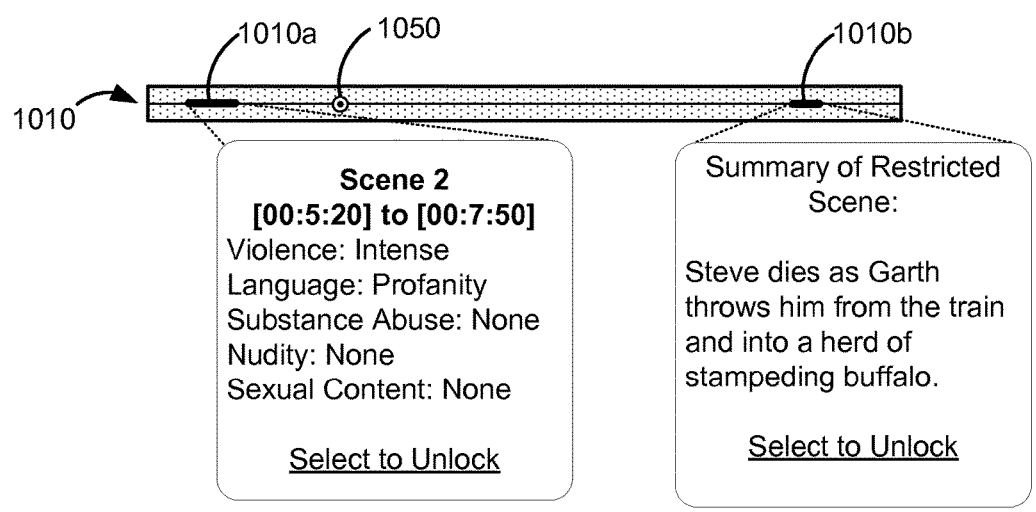

In some implementations, during the playback of media content, viewers can be alerted to approaching scenes corresponding to ratings that are not supposed to be played (i.e., restricted scenes). FIGS. 10A and 10B illustrate examples of indicating restricted scenes based on dynamic multiple video ratings.

In FIG. 10A, warning 1005 may be provided (e.g., displayed on a video player) during the playback of media content to alert a viewer that a restricted scene is approaching. In FIG. 10A, the restricted scene can be unlocked or available for playback by selecting warning 1005 (e.g., by clicking on it with a computer mouse, selecting a button on a remote control, etc.). In some implementations, the viewer may be asked to provide a password, gesture, or other type of input to unlock the restricted scene for playback. As a result, parents can indicate that an R rated movie should be played back with PG-13 rated or lower scenes, but can unlock R rated scenes if they are comfortable with allowing R rated scenes after watching less mature scenes. In one example, media server 210 can receive the selection of warning 1005, receive the input to unlock the restricted scene, and then provide or allow the viewer device to request fragments associated with that scene.

In some implementations, warnings may be provided by text messages to a phone (or a message to another type of device), an alert on a remote control (e.g., flashing a light, etc.), or other mechanisms.

As another example, in FIG. 10B, playback timeline 1010 provides a progress bar of the playback of the media content with the beginning of playback timeline 1010 indicating the start of the playback of the media content, the end of playback timeline 1010 indicating the end of the playback of the media content, and the current playback of the media content occurring at time 1050. In FIG. 10B, playback timeline portions 1010a and 1010b may be restricted scenes and are visually indicated (e.g., with a thick bar in FIG. 10B, but other representations may be used, for example, different colors, text, graphics, etc.) within playback timeline 1010 such that restricted scenes can be easily identified. In some implementations, viewers can select playback timeline portions 1010a and 1010b to receive information regarding the restricted scenes, or the information may be provided when playback of the media content reaches playback timeline portions 1010a and 1010b. For example, regarding playback timeline portion 1010a, the content indicators of the scene are provided so that a viewer (e.g., a parent) can review why the scene is a restricted scene. After reviewing the content indicators, the viewer may choose to unlock that scene for playback. In some implementations, the rating (e.g., PG-13, R, etc.) based on the content indicators can be provided.

Other types of information regarding restricted scenes may be available. For example, regarding playback timeline portion 1010b in FIG. 10B, its selection provides a textual summary of the restricted scene that can be reviewed before choosing to unlock the scene for playback. In other implementations, the portion of the screenplay for that scene can be provided. As a result, media server 210 can receive data indicating selection of playback timeline portions 1010a and 1010b and provide information regarding the restricted scenes to the viewer device.

Many of the preceding examples include skipping more mature scenes of media content. However, less mature scenes of media content can also be skipped. For example, a viewer may only want to watch action scenes of an R-rated movie, and therefore, may request only R-rated scenes for playback (i.e., skip rated G to PG-13 scenes).

Figure 11:
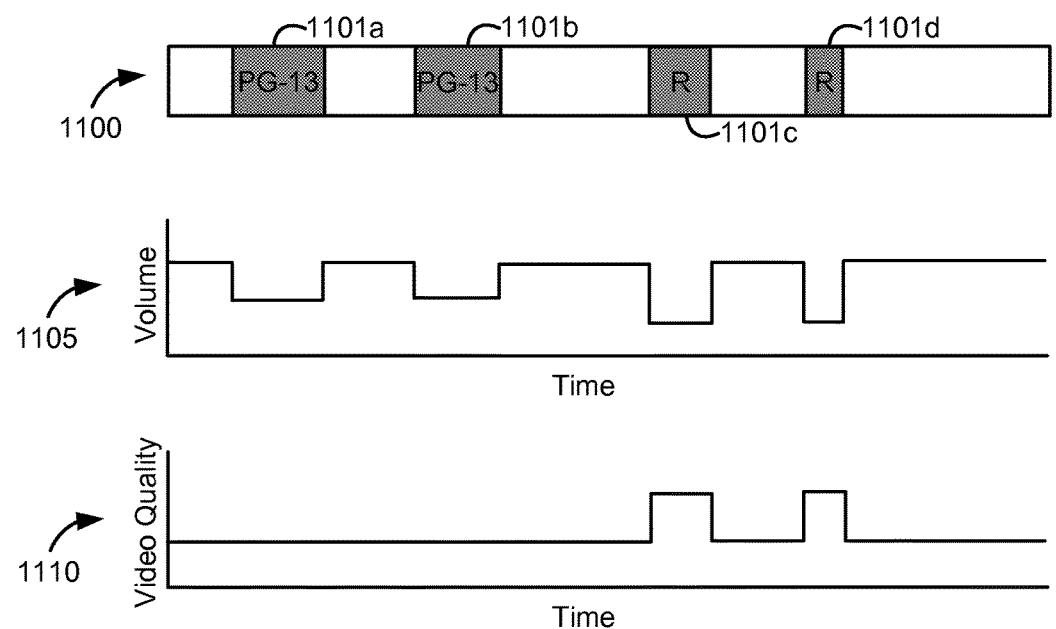
FIG. 11 illustrates an example of adjusting playback of media content based on dynamic multiple video ratings.

Some of the aforementioned features include skipping scenes of media content from playback on a device. However, the data disclosed herein can also be used to modify or adjust the playback in other ways. For example, parents may want to watch an entire R-rated movie (i.e., watch each scene) in a living room while their children are asleep in another room. However, parents may not want to disturb their children during the playback of the R-rated movie. FIG. 11 illustrates an example of adjusting playback of media content based on dynamic multiple video ratings. In FIG. 11, the data indicating ratings of scenes or fragments can be used to adjust the volume and video quality of the playback of the media content. For example, media content 1100 in FIG. 11 might be an R-rated action movie selected for playback on a viewer device. As indicated in volume chart 1105, the volume of the playback of the media content can vary based on the ratings of the scenes of media content 1100. Rated R scenes (e.g., scenes 1101c and 1101d) in an action movie might have explosions, gunshots, characters screaming obscenities, and other loud noises, and therefore, the volume of those scenes may be turned lower during playback of media content 1100 than other scenes, as indicated in volume chart 1105. In FIG. 11, PG-13 scenes 1101a and 1101b have a volume higher than R scenes 1101c and 1101d. In other implementations, rather than adjusting the volume, the audio quality may be similarly adjusted. Likewise, the video quality can also be adjusted based on the ratings of the scenes. For example, video quality chart 1110 indicates that the video quality of R rated scenes 1101c and 110d may increase (i.e., higher than the PG-13 rated scenes 1101a and 1101b) since viewers might watch R-rated action scenes more closely and would appreciate a better video quality than PG-13 rated scenes which might be more focused on character development and might not need the video quality that the R-rated actions scenes might benefit from. In some implementations, the adjustment of the audio quality and/or video quality can include parsing through a manifest file to find fragments indicated as being part of the adjusted audio or video quality level and then requesting those fragments from media server 210.

The playback of media content can also vary in other ways. For example, based on the ratings of the scenes, video might not be provided during playback, but audio may be provided. As another example, the size (i.e., the dimensions) of the playback of the media content can be adjusted based on the ratings.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method, comprising:
receiving, by one or more media servers, content indicators specifying types of content in scenes of media content;
generating, by the one or more media servers, ratings for the scenes within the media content based on the content indicators, the ratings indicating acceptability of the content in the scenes for viewing audiences;
receiving, by the one or more media servers, a request for playback of the media content from a client device;
providing, by the one or more media servers, data indicating fragments of scenes of the media content to the client device, and data representing the ratings of the scenes associated with the fragments to the client device;
receiving, by the one or more media servers, requests for fragments of scenes of the media content from the client device, the requested fragments corresponding to a first subset of the fragments indicated in the data and within a ratings range of acceptability corresponding to the ratings, and a second subset of the fragments indicated in the data and outside the ratings range of acceptability excluded from the requested fragments; and providing, by the one or more media servers, the requested fragments to the client device for playback on the client device.

2. The method of claim 1, wherein the content indicators are provided by users of the one or more media servers.

3. The method of claim 1, wherein a first scene is associated with a first combination of content indicators providing a first rating, a second scene is associated with a second combination of content indicators providing a second rating, the first rating being different than the second rating.

4. The method of claim 3, wherein the requested fragments include fragments from the first scene and no fragments from the second scene.

5. A computing device comprising:
one or more processors and memory configured to:
generate ratings for scenes of media content representing content portrayed in each of the scenes, the media content including a sequence of fragments;
associate the ratings with the fragments;
provide, to a client device, the ratings for the fragments;
receive, from the client device, requests for a first subset of the fragments of the media content based on the provided ratings,
the ratings associated with the first subset of the fragments being within a ratings range corresponding to the ratings,
the requests from the client device excluding a second subset of the fragments of the media content based on the provided ratings, the ratings associated with the second subset of the fragments being outside of the ratings range;
and provide the first subset of the fragments to the client device.

6. The computing device of claim 5, the one or more processors and memory further configured to:
generate content indicators specifying the content portrayed in each of the scenes based on an analysis of the scenes, wherein the ratings are generated based on the content indicators.

7. The computing device of claim 5, the one or more processors and memory further configured to:
receive content indicators specifying the content portrayed in each of the scenes, wherein the ratings are generated based on the content indicators.

8. The computing device of claim 7, wherein a first scene of the media content is associated with a first combination of content indicators providing a first rating, a second scene of the media content is associated with a second combination of content indicators providing a second rating, the first rating being different than the second rating.

9. The computing device of claim 5, the one or more processors and memory further configured to:
cache one or more fragments of the media content based on the ratings.

10. A computer program product comprising one or more non-transitory computer-readable media having computer instructions stored therein, the computer program instructions being configured such that, when executed by one or more computing devices, the computer program instructions cause the one or more computing devices to:
generate ratings for scenes of media content representing content portrayed in each of the scenes, the ratings indicating acceptability of the content in the scenes for viewing audiences, the media content including a sequence of fragments;
associate the ratings with the fragments;
provide, to a client device, the ratings for the fragments;
receive, from the client device, requests for a first subset of the fragments of the media content based on the provided ratings,
the ratings associated with the first subset of the fragments being within a ratings range of acceptability corresponding to the ratings,
the requests from the client device excluding a second subset of the fragments of the media content based on the provided ratings, the ratings associated with the second subset of fragments being outside of the ratings range of acceptability;
and provide the first subset of the fragments to the client device.

11. The computer program product of claim 10, wherein the computer program instructions further cause the one or more computing devices to:
generate content indicators specifying the content portrayed in each of the scenes based on an analysis of the scenes, wherein the ratings are generated based on the content indicators.

12. The computer program product of claim 10, wherein the computer program instructions further cause the one or more computing devices to:
receive content indicators specifying the content portrayed in each of the scenes, wherein the ratings are generated based on the content indicators.

13. The computing program product of claim 12, wherein a first scene of the media content is associated with a first combination of content indicators providing a first rating, a second scene of the media content is associated with a second combination of content indicators providing a second rating, the first rating being different than the second rating.

14. The computing program product of claim 10, wherein the computer program instructions further cause the one or more computing devices to:
cache one or more fragments of the media content based on the ratings.

15. A computer program product comprising one or more non-transitory computer-readable media having computer instructions stored therein, the computer program instructions being configured such that, when executed by one or more computing devices, the computer program instructions cause the one or more computing devices to:
request playback of media content;
receive ratings of scenes of the media content, the ratings indicating acceptability of the content in the scenes for viewing audiences;
receive a manifest indicating fragments of the media content available for playback;
correlate the fragments of the media content with the ratings of the scenes of the media content, the correlating including identifying a first subset of the fragments as being within a ratings range of acceptability and a second subset of the fragments as being outside the ratings range of acceptability;
request the first subset of fragments of the media content based on the correlation of the fragments with the ratings; and
receive the first subset of the requested fragments for playback.

16. The computer program product of claim 15, wherein the computer program instructions further cause the one or more computing devices to:
provide playback options of the media content based on the ratings of the scenes.

17. The computer program product of claim 16, wherein the playback options include a first playback option and a second playback option, the first playback option including the first subset of the fragments and not the second subset of the fragments, the second playback option including the first subset of the fragments and the second subset of the fragments.

18. The computer program product of claim 17, wherein the first playback option is associated with a first rating, the second playback option is associated with a second rating, the first rating and the second rating being different.

19. The computer program product of claim 17, wherein the first subset of the fragments correspond to a first number of scenes, and the second subset of the fragments correspond to a second number of scenes, the second number being different than the first number.

20. The computer program product of claim 19, wherein the first number of scenes includes a first scene, and the second number of scenes includes the first scene and a second scene, the second scene not included in the first number of scenes.

* * * * *